F. M. GUY.
STARTER ATTACHMENT FOR MOTOR VEHICLES.
APPLICATION FILED NOV. 21, 1914.
1,130,814.
Patented Mar. 9, 1915.
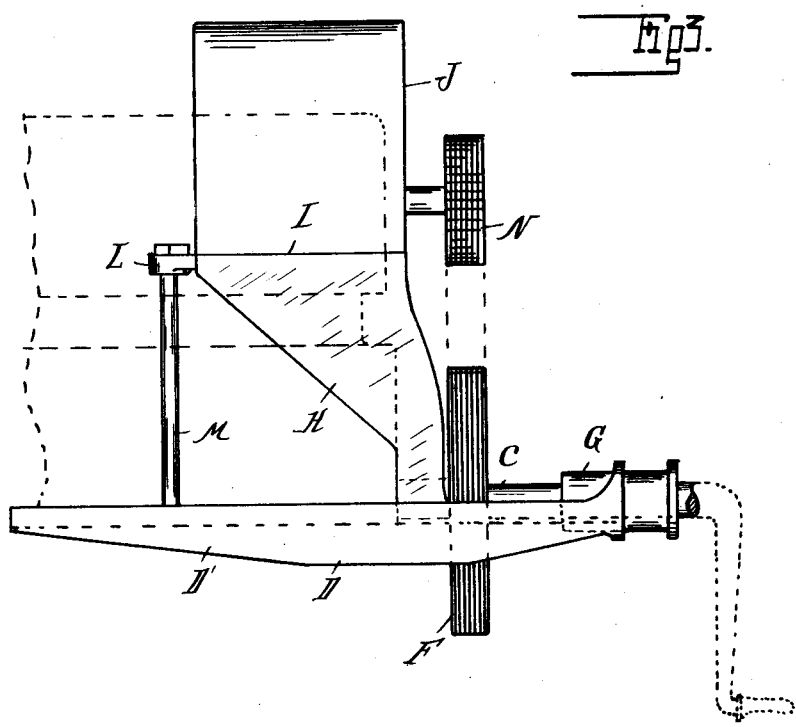
WITNESSES:
INVENTOR
Frederick M. Guy.
BY
ATTORNEYS

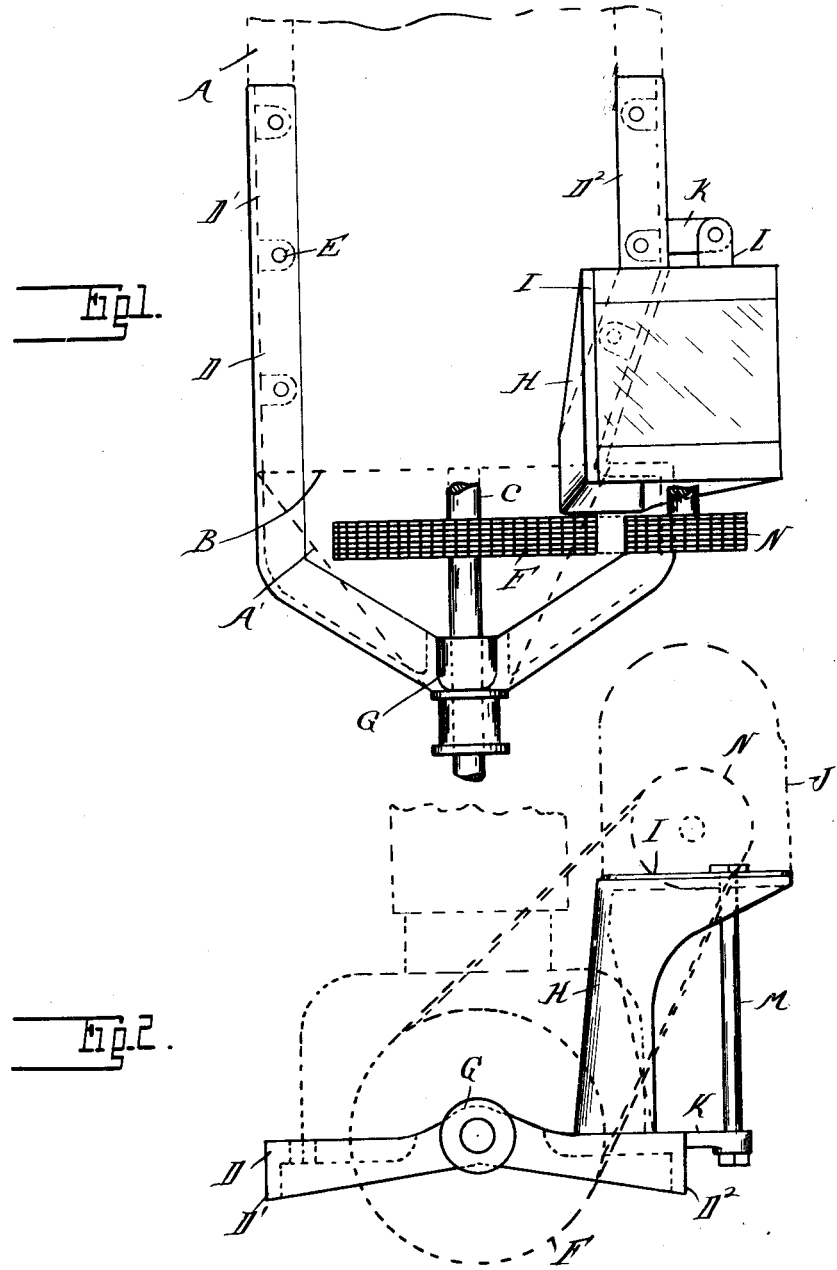

UNITED STATES PATENT OFFICE.

FREDERICK M. GUY, OF DETROIT, MICHIGAN, ASSIGNOR TO THE DISCO ELECTRIC STARTER COMPANY, OF DETROIT, MICHIGAN, A CORPORATION OF MICHIGAN.

STARTER ATTACHMENT FOR MOTOR-VEHICLES.

1,130,814.      Specification of Letters Patent.      Patented Mar. 9, 1915.

Application filed November 21, 1914. Serial No. 873,334.

*To all whom it may concern:*

Be it known that I, FREDERICK M. GUY, a citizen of the United States of America, residing at Detroit, in the county of Wayne and State of Michigan, have invented certain new and useful Improvements in Starter Attachments for Motor-Vehicles, of which the following is a specification, reference being had therein to the accompanying drawings.

The invention relates to starter attachments for motor vehicles, and it is the object of the invention to obtain a construction which is applicable to a certain type of motor cars not adapted for the direct attachment of the starting-motor and its transmission.

To this end the invention comprises the peculiar construction of a frame for replacing a portion of the motor-suspension and constituting also a mounting for the starting-motor and transmission.

The invention further comprises various features of construction as hereinafter set forth.

In the drawings: Figure 1 is a plan view of the replacement and starter-mounting frame showing the engine shaft and the sprocket mounted thereon for the starting-motor and transmission, and also showing in dotted lines the portion of the frame replaced; Fig. 2 is a side elevation of said frame; and Fig. 3 is an end elevation thereof showing in dotted lines the starting-motor and transmission gearing.

With a certain type of motor vehicles extensively used the motor casing is provided with a pressed sheet metal pan, which extends forward to form a journal for the starting crank-shaft and also a point of suspension on the vehicle frame. The motor is designed for hand starting and the starting crank is also journaled in this forward extension of the pan. Where a starting motor is applied to this type of vehicle it is necessary to have a step-down transmission between the starter and the crank-shaft for decreasing the speed and increasing the power. There is not, however, sufficient clearance provided by the pressed sheet metal extension for the placing of the large gear required on the engine shaft. Thus to obtain the necessary speed reduction an intermediate shaft and gears would be required, which would both complicate and increase the expense of the installation. With the present invention I have avoided this difficulty by cutting away the forward bearing and so much of the forward extension of the pan as would interfere with the mounting of the gear on the crank shaft. A replacement frame is then provided which is so designed as to provide the required clearance for the gear, form the bearing for the starting crank-shaft and suspension for the engine frame, and also form a mounting for the starting-motor.

As shown in dotted lines A is the engine pan and A' an extension thereof, which is cut away to the line B, leaving the projecting crank-shaft C.

D is a yoke frame having the side portions D' and D² which are apertured at E for engagement with the clamping bolts which secure the pan A to the upper portion of the engine casing. The forward portion of this frame is laterally enlarged beyond the outlines of the original pan to provide clearance for the large gear-wheel F mounted on the shaft C, and a journal bearing G is preferably formed integral with the frame to replace the removed journal bearing for the starting crank-shaft.

At one side of the frame D is an upwardly-extending bracket arm H provided at its top with the laterally-extending bed or table I on which the motor J is mounted. This bracket arm and table are preferably formed integral with the frame D, and to provide a support for the outer portion of the table a lug K projects laterally from the portion D² and a lug L projects from the table I to receive a supporting bolt or post M. The starter J when mounted upon the table I is arranged so that the small sprocket N on the starter shaft will mesh with the chain driving the large sprocket-wheel F on the crank-shaft to form a transmission with the necessary decrease in speed and increase in torque.

The construction described is one which is inexpensive to manufacture, and also one which may be quickly mounted upon the motor vehicle. To add the attachment it is only necessary to first cut off the original pressed sheet metal extension along the line B, then place the gear-wheel F upon the crank shaft, after which the frame D is secured by bolting the portions D' and D² thereof adjacent to the pan and by the securing bolts thereof. The starter may then be mounted upon the table I with its sprocket N in mesh with the chain driving the sprocket-wheel F as before described.

What I claim as my invention is:—

1. In a starter attachment for motor vehicles provided with a motor frame, a starting motor, and a frame adapted to form a replacement for a portion of the motor frame, providing clearance for a gear-wheel mounted on the crank-shaft and adapted to form a mounting for the starting-motor.

2. In a starter attachment for motor vehicles provided with a starting crank bearing, a frame adapted to form a replacement for the starting crank bearing, providing clearance for a gear-wheel mounted on the crank-shaft and having a mounting for a starting-motor.

3. In a starter attachment for motor vehicles provided with a motor frame, a frame adapted to form a replacement for the forward suspension of the motor frame, said replacement frame providing clearance for a gear-wheel mounted on the crank-shaft and having a mounting for a starting-motor thereon.

4. In a starter attachment for motor vehicles provided with a starting crank bearing, an integral frame adapted to form a replacement for the starting crank bearing and forward suspension of the motor frame, said replacement frame providing clearance for a gear-wheel on the crank-shaft and having a rest or mounting for the starting-motor.

5. In a starter attachment for motor vehicles provided with a frame, a yoke-shaped frame adapted to form a replacement for the forward portion of the motor frame, including the starting crank bearing and forward motor suspension, said frame providing clearance for a gear-wheel mounted on the crank-shaft and having an upwardly-extending bracket-arm with a laterally-extending bed or table constituting a mounting for the starting-motor.

6. In a starter attachment for motor vehicles provided with an engine, a yoke-shaped replacement frame having side portions attachable to the sides of the engine casing, a bearing on its forward portion for the starting crank and forward motor suspension, a bracket-arm extending upwardly from one side of the frame, and a laterally-extending bed or table on said bracket-arm adapted to form a support for the starting-motor.

In testimony whereof I affix my signature in presence of two witnesses.

FREDERICK M. GUY.

Witnesses:
JAMES P. BARRY,
HENRI E. BOWMAN.